United States Patent

Maruyama et al.

[11] 3,923,794
[45] Dec. 2, 1975

[54] NOVEL PROPENYLAMINE DERIVATIVES AND PROCESS FOR THE PRODUCTION THEREOF

[75] Inventors: Isamu Maruyama; Masaru Nakao; Kikuo Sasajima; Izumi Yanagihara, all of Osaka; Shigeho Inaba; Hisao Yamamoto, both of Hyogo, all of Japan

[73] Assignee: Sumitomo Chemical Company, Limited, Osaka, Japan

[22] Filed: July 10, 1974

[21] Appl. No.: 487,401

Related U.S. Application Data

[62] Division of Ser. No. 283,025, Aug. 23, 1972, Pat. No. 3,840,529.

[30] Foreign Application Priority Data

Aug. 26, 1971 Japan................................ 46-65641

[52] U.S. Cl...... 260/240 A; 260/240 R; 260/240 G; 260/268 R; 260/268 PH; 260/293.6; 260/293.66; 260/293.84; 260/294.8 C; 260/575; 260/578; 260/562 R; 260/562 A; 260/607 R; 260/607 A; 260/612 D; 260/613 D; 424/250; 424/267
[51] Int. Cl.²........................................ C07D 471/10
[58] Field of Search........ 260/240 A, 240 R, 240 G, 260/293.66, 294.8 C

[56] References Cited
UNITED STATES PATENTS 3,629,267  12/1971  Kaiser et al.................. 260/294.8 C
3,644,343  2/1972  Manning......................... 260/240 R
3,712,898  1/1973  Kaiser et al.................... 260/293.57

*Primary Examiner*—Arthur P. Demers
*Attorney, Agent, or Firm*—Sughrue, Rothwell, Mion, Zinn and Macpeak

[57] ABSTRACT

Novel propenylamine derivatives represented by the general formula

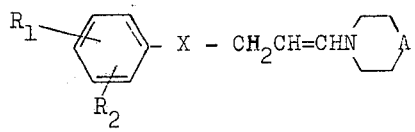

wherein $R_1$, $R_2$, X and A are as defined hereinafter, and pharmaceutically acceptable salts thereof, useful as anti-psychotic tranquillizing, analgesic, anti-convulsive, anti-hypertensive and anti-inflammatory agents are disclosed. The propenylamine derivatives of this invention can be prepared by reacting the corresponding propenyl halide with an amine derivative.

1 Claim, No Drawings

NOVEL PROPENYLAMINE DERIVATIVES AND PROCESS FOR THE PRODUCTION THEREOF

This is a division of Ser. No. 283,025, filed Aug. 23, 1972 now Pat. No. 3,840,529.

SUMMARY OF THE INVENTION

The present invention relates to novel propenylamine derivatives, pharmaceutically acceptable salts thereof and a process for preparing the same. More particularly, this invention relates to novel propenylamine derivatives represented by the general formula (I)

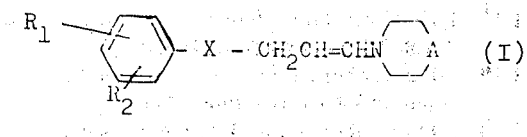

wherein $R_1$ is a hydrogen atom, a lower alkyl, lower alkoxy, nitro, amino, lower alkanoylamino or trifluoromethyl group or a halogen atom; $R_2$ is a hydrogen atom or a halogen atom; X is an oxygen atom, a sulfur atom, a sulfinyl or sulfonyl group; and A is a member selected from the group consisting of

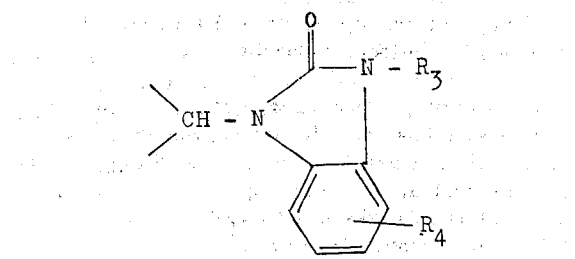

wherein $R_3$ is a hydrogen atom or a lower alkanoyl group and $R_4$ is a hydrogen atom, a halogen atom or a lower alkyl group;

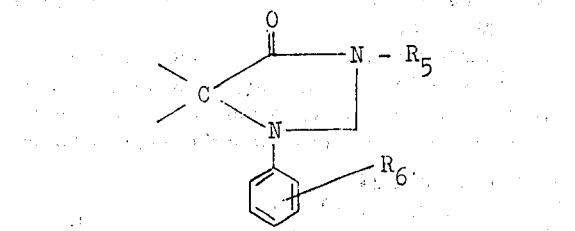

wherein $R_5$ is a hydrogen atom or a lower alkanoyl group and $R_6$ is a hydrogen atom, a halogen atom or a lower alkyl group;

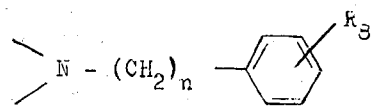

wherein $R_7$ is a hydrogen atom, a halogen atom, a lower alkyl group or a trifluoromethyl group; and

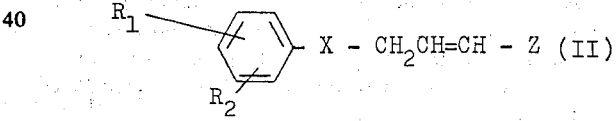

wherein $R_8$ is a hydrogen atom, a halogen atom, a lower alkyl group or a lower alkoxy group, and $n$ is 0, 1 or 2.

As used herein, the terms "lower alkyl", "lower alkoxy" and "lower alkanoyl" mean such groups containing from one to seven carbon atoms which may be either straight or branched. Thus, the term "lower alkyl group" includes, for example, methyl, ethyl, n-propyl, isopropyl, iso-butyl, n-hexyl, and the like, the term "lower alkoxy group" includes methoxy, ethoxy, n-propoxy, iso-propoxy and the like, and the term "lower alkanoyl group" includes, for example, acetyl, propionyl, and the like. The term "halogen atom" includes a chlorine, bromine, fluorine or iodine atom.

The process of this invention comprises reacting a propenyl halide represented by the general formula (II)

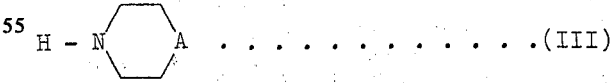

wherein $R_1$, $R_2$ and X are as defined above, and Z is a halogen atom, preferably, a chlorine, bromine or iodine atom, with an amine derivative of the general formula (III)

$$H - N\diagup\!\!\diagdown A \quad\ldots\ldots\ldots\ldots(III)$$

wherein A is as defined above and, if necessary, converting the resulting reaction product into a pharmaceutically acceptable acid addition salt thereof.

The propenyl halides of the general formula (II), starting materials used in the present invention, are easily prepared in the conventional procedure according to the following reaction scheme:

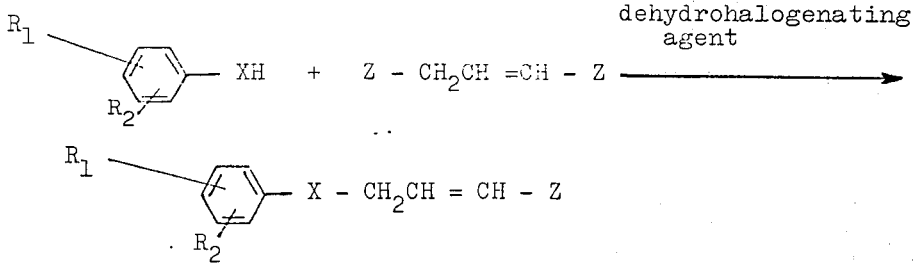

dehydrohalogenating agent wherein $R_1$, $R_2$, X and Z are as defined above.

An object of this invention is therefore to provide novel propenylamine derivatives represented by the general formula (I) and the pharmaceutically acceptable salts thereof which are useful as anti-psychotic, tranquillizing, analgesic, anti-convulsive, anti-hypertensive and anti-inflammatory agents.

Another object of this invention is to provide a process for preparing the propenylamine derivatives represented by the general formula (I) and the pharmaceutically acceptable salts thereof.

A further object of this invention is to provide a pharmaceutical composition comprising, as an active ingradient, at least one of the compounds represented by the formula (I) and the pharmaceutically acceptable salts thereof.

The reaction of the present invention is carried out at a temperature between 0°C and the boiling point of the solvent used in the absence or presence of an appropriate dehydrohalogenating agent in an inert organic solvent such as benzene, toluene, xylene, dimethylformamide, pyridine, methanol, ethanol, n-propanol, isopropanol, n-butanol and a mixture thereof.

Examples of the dehydrohalogenating agent which can be used include, for example, an alkali metal carbonate such as sodium carbonate and potassium carbonate, an alkali metal hydroxide such as sodium hydroxide and potassium hydroxide, an alkali metal bicarbonate such as sodium bicarbonate and potassium bicarbonate, an alkali metal hydride such as sodium hydride and potassium hydride, an alkyl amine such as trimethyl amine, and the like.

The novel propenylamine derivatives represented by the general formula (I) can form their acid addition salts with a variety of inorganic or organic acids such as hydrochloric acid, hydrobromic acid, sulfuric acid, phosphoric acid, nitric acid, tartaric acid, salicylic acid, p-toluene sulfonic acid, oxalic acid, maleic acid, fumaric acid, succinic acid, malic acid, formic acid, acetic acid and the like.

The representative compounds of this invention which can be prepared according to the above process are as follows:

1-{1-[3-(p-Fluorophenylthio)-1-propenyl]-4-piperidyl}-2-oxobenzimidazoline,
1-{1-[3-(p-Fluorophenoxy)-1-propenyl]-4-piperidyl}-2-oxobenzimidazoline,
1-Phenyl-8-[3-(p-fluorophenoxy)-1-propenyl]-4-oxo-1,3,8-triazaspiro[4,5]decane,
1-[3-(p-Fluorophenoxy)-1-propenyl]-4-(p-chlorophenyl)-4-hydroxypiperidine,
1-[3-(p-Fluorophenoxy)-1-propenyl]-4-(m-trifluorophenyl)-4-hydroxypiperidine,
1-[3-(p-Fluorophenoxy)-1-propenyl]-4-(o-methoxyphenyl)piperazine,
1-[3-(p-Fluorophenylthio)-1-propenyl]-4-(o-methoxyphenyl)piperazine,
1-[3-(p-Fluorophenylsulfinyl)-1-propenyl]-4-(o-methyloxyphenyl)piperazine,
1-[3-(p-Fluorophenylsulfinyl)-1-propenyl]-4-(o-chlorophenyl)piperazine,
1-[3-(p-Fluorophenylsulfonyl)-1-propenyl]-4-(o-methoxyphenyl)piperazine,
1-Phenyl-8-[3-(p-fluorophenylthio)-1-propenyl]-4-oxo-1,3,8-triazaspiro-4,5-decane,
1-[3-(p-Fluorophenylthio)-1-propenyl]-4-(p-chlorophenyl)-4-hydroxypiperidine,
1-[3-(p-Fluorophenylthio)-1-propenyl]-4-(m-trifluoromethylphenyl)-4-hydroxypiperidine,
1-[3-(p-Methoxyphenoxy)-1-propenyl]-4-(m-trifluorophenyl)-4-hydroxypiperidine,
1-Phenyl-8-[3-(p-methoxyphenylthio)-1-propenyl]-4-oxo-1,3,8-triazaspiro-4,5-decane,
1-{1-[3-(p-Methoxyphenylthio)-1-propenyl]-4-piperidyl}-2-oxobenzimidazoline,
1-{1-[3-(p-Tolylthio)-1-propenyl]-4-piperidyl}-2-oxobenzimidazoline,
1-{1-[3-(p-Nitrophenylthio)-1-propenyl]-4-piperidyl}-2-oxobenzimidazoline,
1-{1-[3-(p-Aminophenylthio)-1-propenyl]-4-piperidyl}-2-oxobenzimidazoline,
1-{1-[3-(p-Acetamidophenylthio)-1-propenyl]-4-piperidyl}-2-oxobenzimidazoline.

The novel propenylamine derivatives and their acid addition salts have valuable pharmacological properties, in particular anti-psychotic, tranquillizing, analgesic, anti-convulsive, anti-hypertensive or anti-inflammatory activities.

The propenylamine derivatives of this invention can be administered orally as anti-psychotic, tranquillizing, analgesic, anti-convulsive, anti-hypertensive or anti-inflammatory agents in the conventional dosage forms such as tablet, capsule, solution, suspension, elixir or the like.

A typical tablet is constituted by from 1 to 20 per cent binder, e.g. tragacanth; from 5 to 20 per cent lubricant, e.g. talcum, magnesium stearate etc.; an average dose of active ingredient; and q.s. 10 per cent of filler, e.g. lactose. The usual oral dosage is 1 to 1000 mg per as daily.

The present invention is further disclosed in the following examples of more preferred embodiments thereof, which are presented for the purpose of illustration and it is not intended to limit the scope of the invention.

EXAMPLE 1

A mixture of 2.23 g of 1-(p-fluorophenylthio)-3-chloro-2-propene, 2.17 g of 1-(4-piperidyl)-2-oxobenzimidazoline, 0.52 g of sodium carbonate, and 30 ml. of dimethylformamide was heated at a temperature of 80°–90°C for 12 hours. After cooling, the reaction mixture was poured into 100 ml. of water and extracted with benzene. The extract was then evaporated under reduced pressure. The oily residue was dissolved in isopropyl alcohol and to this solution was added a warm solution of oxalic acid of the amount equimolar to the reactant material in isopropyl alcohol. After cooling, the precipitated oxalate was collected by filtration and dried to give 1-{1-[3-(p-fluorophenylthio)-1-propenyl]-4-piperidyl}-2-oxobenzimidazoline oxalate having a melting point of 130°–170°C (decomposed). Recrystallization from ethanol gave purified product having a melting point of 196°–198°C (decomposed).

The following compounds were obtained in the same manner as in Example 1;

1-Phenyl-8-[3-(p-fluorophenylthio)-1-propenyl]-4-oxo-1,3,8-triazaspiro[4,5]decane, m.p. 174°–176°C.
1-[3-(p-Fluorophenylthio)-1-propenyl]-4-(p-chlorophenyl)-4-hydroxypiperidine oxalate, m.p. 185°–186°C (decomposed).

While the invention has been described in detail and in terms of specific embodiments thereof, it will be apparent that various changes and modifications can be made therein without departing from the spirit and scope thereof.

What is claimed is:
1. A propenylamine derivative of the formula

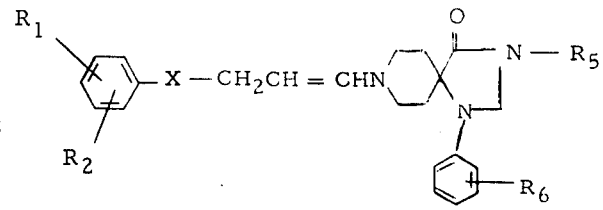

wherein $R_1$ is a hydrogen atom, a halogen atom, a lower alkyl, lower alkoxy, nitro, lower alkanoylamino or trifluoromethyl group; $R_2$ is a hydrogen or halogen atom; X is an oxygen atom, a sulfur atom, a sulfinyl or sulfonyl group; $R_5$ is a hydrogen atom or a lower alkanoyl group and $R_6$ is a hydro atom, a halogen atom or a lower alkyl group and the pharmaceutically acceptable addition salts thereof.

* * * * *